United States Patent
Yoshizawa et al.

(10) Patent No.: US 9,712,100 B2
(45) Date of Patent: Jul. 18, 2017

(54) ELECTRIC ROTATING MACHINE AND CONTROL METHOD THEREFOR

(71) Applicant: Mitsubishi Electric Corporation, Chiyoda-ku, Tokyo (JP)

(72) Inventors: Toshiyuki Yoshizawa, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/992,102

(22) Filed: Jan. 11, 2016

(65) Prior Publication Data
US 2017/0077860 A1   Mar. 16, 2017

(30) Foreign Application Priority Data
Sep. 16, 2015  (JP) ................................ 2015-182518

(51) Int. Cl.
*H02P 27/06* (2006.01)
*H02K 11/04* (2016.01)
*H02K 11/33* (2016.01)

(52) U.S. Cl.
CPC ............... *H02P 27/06* (2013.01); *H02K 11/04* (2013.01); *H02K 11/33* (2016.01)

(58) Field of Classification Search
CPC .......... H02P 27/06; H02K 11/33; H02K 11/04
See application file for complete search history.

(56) References Cited

U.S. PATENT DOCUMENTS

| | | | | |
|---|---|---|---|---|
| 7,915,843 B2 * | 3/2011 | Mishima | ............... | H02P 6/16 318/400.04 |
| 8,310,184 B2 * | 11/2012 | Takeuchi | ............... | H02P 6/16 318/400.04 |
| 8,912,741 B2 * | 12/2014 | Wakabayashi | ......... | H02P 6/085 318/400.01 |
| 2004/0135529 A1 * | 7/2004 | Yoshitomi | ............... | H02P 6/26 318/400.04 |
| 2008/0218111 A1 | 9/2008 | Okamura | | |
| 2009/0045762 A1 * | 2/2009 | Hayashi | ............... | H02P 7/29 318/379 |

(Continued)

FOREIGN PATENT DOCUMENTS

| | | |
|---|---|---|
| JP | 08-116699 A | 5/1996 |
| JP | 2003-61398 A | 2/2003 |

(Continued)

OTHER PUBLICATIONS

Machine translation JP 2012175866 A.*
Communication dated Jun. 21, 2016 from the Japanese Patent Office issued in corresponding Application No. 2015-182518.

*Primary Examiner* — Kawing Chan
(74) *Attorney, Agent, or Firm* — Sughrue Mion, PLLC; Richard C. Turner

(57) ABSTRACT

When a rotating machine unit is under at least a predetermined operation condition in a motor mode or when the rotating machine unit is under at least a predetermined operation condition in an electric power generator mode, there is performed electric-power conversion control in which there are combined rectangular wave energization control where an armature winding is energized with a rectangular wave and duty energization control where the armature winding is energized with the rectangular wave at a predetermined duty ratio.

16 Claims, 8 Drawing Sheets

(56) References Cited

U.S. PATENT DOCUMENTS

| | | | | |
|---|---|---|---|---|
| 2009/0049463 A1* | 2/2009 | Ueda | ............... | H02P 6/28 |
| | | | | 720/695 |
| 2009/0153084 A1* | 6/2009 | Mishima | ............... | H02P 6/16 |
| | | | | 318/400.13 |
| 2011/0273125 A1* | 11/2011 | Yamada | ............... | H02P 21/0003 |
| | | | | 318/503 |

FOREIGN PATENT DOCUMENTS

| JP | 2006-320039 A | 11/2006 |
|----|---------------|---------|
| JP | 2012-175866 A | 9/2012 |

\* cited by examiner

ELECTRIC ROTATING MACHINE AND CONTROL METHOD THEREFOR

BACKGROUND OF THE INVENTION

Field of the Invention

The present invention relates to an electric rotating machine that can function while performing, as occasion demands, switching between a motor mode where a vehicle power source or the like supplies electric power to the electric rotating machine so that the electric rotating machine functions as a motor and an electric power generator mode where an engine or the like mounted in the vehicle supplies motive power to the electric rotating machine so that the electric rotating machine functions as an electric power generator, and relates to a control method for the electric rotating machine.

Description of the Related Art

An electric rotating machine, which can function while performing switching between the motor mode and the electric power generator mode and is referred to as a so-called motor generator, is well known. Such an electric rotating machine is mounted in a vehicle such as an automobile and is supplied with electric power from a vehicle power source apparatus such as a vehicle battery so as to function in the motor mode and to perform engine starting and a torque assist for the engine; on the other hand, its rotor is rotation-driven so that it functions in the electric power generator mode so as to charge the vehicle power source and to supply electric power to vehicle electric loads.

In recent years, in order to raise the gasoline mileage of a vehicle and to make a vehicle conform to the environmental standard, there has been developed a vehicle that performs a so-called idling stop in which the engine thereof is stopped when the vehicle is stopped and the engine thereof is restarted when the vehicle is started again. In a vehicle that performs an idling stop, instead of a vehicle electric power generator having only the function of an electric power generator, an electric rotating machine as the foregoing motor generator is mounted; the electric rotating machine is made to function in the electric power generator mode so as to supply electric power to vehicle electric loads and a vehicle power source apparatus such as a battery; when the vehicle is restarted, the electric rotating machine is made to function in the motor mode so as to restart the engine.

It is required that such a vehicle electric rotating machine is small-size and inexpensive. Accordingly, as disclosed, for example, in Patent Document 1, as the control method for an electric rotating machine, a method of energizing the electric rotating machine with a rectangular wave current is adopted instead of a method of applying pulse width modulation to a sinusoidal wave, so that the configuration of an electric-power conversion unit that functions as an inverter or a converter and the control therefor are simplified and hence downsizing and cost saving of the electric rotating machine is achieved.

In order to raise the gasoline mileage, it is required to increase the output of an electric rotating machine; thus, the voltage of a vehicle power source apparatus such as a battery is raised so that the output of an electric rotating machine is increased. Furthermore, as disclosed in Patent Document 1, in the case where an electric rotating machine is made to function as an electric power generator, the magnetization direction of the magnetic-field current is reversed and the energization phase of a rectangular wave current to the armature winding is delayed so that the power-generation output of the electric rotating machine is raised.

PRIOR ART REFERENCE

Patent Document

[Patent Document 1] Japanese Patent Application Laid-Open No. H8-116699

However, in the case of the foregoing conventional electric rotating machine, because the electric rotating machine is controlled by energizing the armature winding with a rectangular wave current, the driving current from the vehicle power source apparatus cannot be controlled when the electric rotating machine is made to function in the motor mode; therefore, in the case where the output of the electric rotating machine is increased by raising the voltage of the vehicle power source apparatus, it is required to select an electric-power conversion device included in the electric-power conversion unit, considering the maximum driving current, because the driving current for the electric rotating machine cannot be controlled; thus, because it is required to utilize an electric-power conversion device having a large-capacity rated specification, there has been a problem that the electric-power conversion unit is upsized. Moreover, there is required thermal design in which heat generation in the electric-power conversion device at a time when the driving current is maximum is taken into consideration and hence, in the case of air cooling, it is required to upsize the cooling unit such as a heat sink; thus, there has been a problem that the electric-power conversion unit is upsized.

Furthermore, in the foregoing conventional electric rotating machine, because in the case where the electric rotating machine is made to function in the electric power generator mode, the voltage of the vehicle power source apparatus is increased, the rotation speed at a time when electric power generation is started is large (high); thus, there has been a problem that electric power generation at the rotation speed corresponding to the idle rotation speed of the engine cannot be implemented. Still moreover, there has been a problem that in the case where for the purpose of suppressing a current at a time when the electric rotating machine is driven and decreasing the rotation speed at a time when electric power generation is started, the number of turns of the armature winding is increased, the maximum output of the electric rotation machine is reduced. Still furthermore, there has been a problem that in the case where for the purpose of increasing the power-generation output of the electric rotating machine, electric power is generated while the magnetization direction of the magnetic-field current is reversed and the energization phase of a rectangular wave current to the armature winding is delayed, large-time-constant switching of the magnetization directions of the magnetic-field winding is required and hence the responsiveness of the control is deteriorated.

The present invention has been implemented in order to solve the problems in the foregoing conventional apparatuses; the objective thereof is to provide an electric rotating machine that can suppress the driving current at a time when the electric rotating machine is driven and can raise the power-generation output at a time when the electric rotating machine generates electric power, without upsizing the electric-power conversion unit; the objective thereof is also to provide a control method for the electric rotating machine.

SUMMARY OF THE INVENTION

An electric rotating machine according to the present invention includes a rotating machine unit including a stator unit having an armature winding and a rotor unit having a magnetic-field winding, an electric-power conversion unit that has a plurality of electric-power conversion devices and performs electric-power conversion between the rotating machine unit and a power source apparatus through switching operation by the plurality of electric-power conversion devices, and a control unit that controls the electric-power conversion unit; the electric rotating machine is characterized in that the rotating machine unit can function in both a motor mode and an electric power generator mode, in that the control unit includes a calculation unit, a rectangular wave energization signal generation circuit that generates a predetermined rectangular wave energization control signal, based on a command from the calculation unit, an armature duty signal generation circuit that can generate an armature duty control signal having a predetermined duty ratio, based on a command from the calculation unit, and a signal processing unit that generates a power-conversion device driving signal for driving the electric-power conversion device, based on a logic operation of the rectangular wave energization control signal and the armature duty control signal, in that the armature duty control signal has a frequency higher than that of the rectangular wave energization control signal, and in that when the rotating machine unit is under at least a predetermined operation condition in the motor mode or when the rotating machine unit is under at least a predetermined operation condition in the electric power generator mode, the electric-power conversion unit performs electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

A control method for an electric rotating machine according to the present invention is a control method for an electric rotating machine including a rotating machine unit including a stator unit having a armature winding and a rotor unit having a magnetic-field winding, an electric-power conversion unit that has a plurality of electric-power conversion devices and performs electric-power conversion between the rotating machine unit and a power source apparatus through switching operation by the plurality of electric-power conversion devices, and a control unit that controls the electric-power conversion unit; the control method for an electric rotating machine is characterized in that the rotating machine unit can function in both a motor mode and an electric power generator mode, in that based on a control command, the control unit generates a predetermined rectangular wave energization control signal and an armature duty control signal having a frequency higher than that of the rectangular wave energization control signal and a predetermined duty ratio, in that based on a logic operation of the rectangular wave energization control signal and the armature duty control signal, the control unit generates a power-conversion device driving signal for driving the electric-power conversion device, and in that when the rotating machine unit is under at least a predetermined operation condition in the motor mode or when the rotating machine unit is under at least a predetermined operation condition in the electric power generator mode, there is performed electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

In the electric rotating machine according to the present invention, the control unit includes a calculation unit, a rectangular wave energization signal generation circuit that generates a predetermined rectangular wave energization control signal, based on a command from the calculation unit, an armature duty signal generation circuit that can generate an armature duty control signal having a predetermined duty ratio, based on a command from the calculation unit, and a signal processing unit that generates a power-conversion device driving signal for driving the electric-power conversion device, based on a logic operation of the rectangular wave energization control signal and the armature duty control signal; the armature duty control signal has a frequency higher than that of the rectangular wave energization control signal; when the rotating machine unit is under at least a predetermined operation condition in the motor mode or when the rotating machine unit is under at least a predetermined operation condition in the electric power generator mode, the electric-power conversion unit performs electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

As a result, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

In a control method for an electric rotating machine according to the present invention, the control unit generates a predetermined rectangular wave energization control signal and an armature duty control signal having a frequency higher than that of the rectangular wave energization control signal and a predetermined duty ratio; based on a logic operation of the rectangular wave energization control signal and the armature duty control signal, the control unit generates a power-conversion device driving signal for driving the electric-power conversion device; when the rotating machine unit is under at least a predetermined operation condition in the motor mode or when the rotating machine unit is under at least a predetermined operation condition in the electric power generator mode, there is performed electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

As a result, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
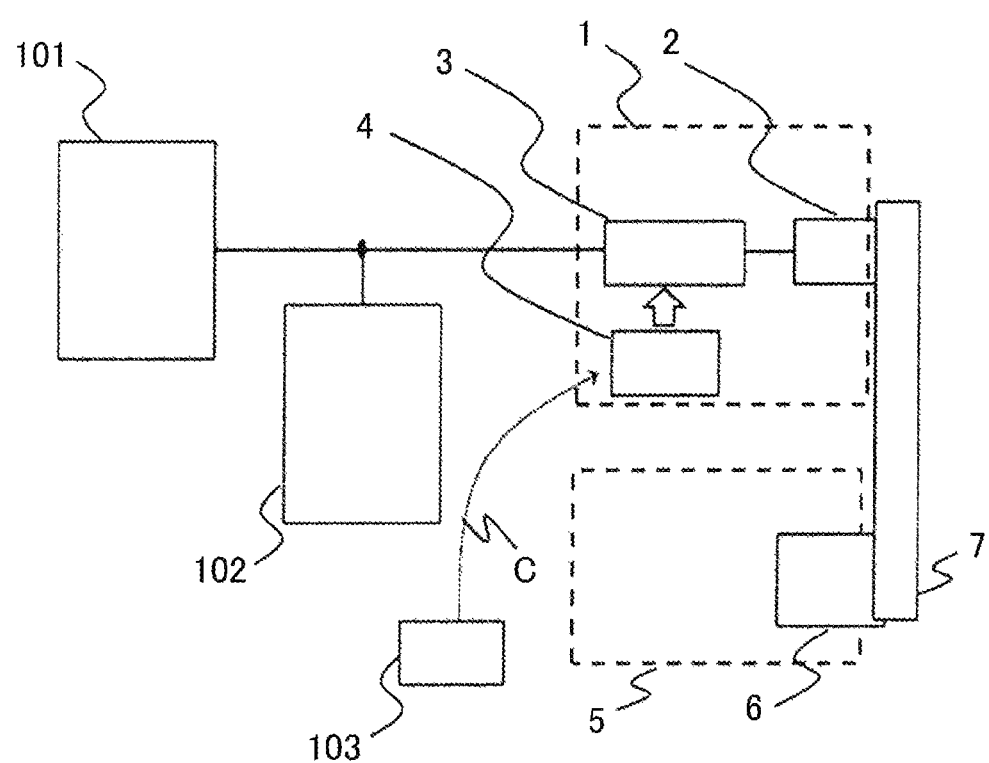
FIG. 1 is a block diagram illustrating an example of power source system of a vehicle equipped with an electric rotating machine according to Embodiment 1 of the present invention.

An electric rotating machine according to a preferred embodiment of the present invention includes a rotating machine unit, an electric-power conversion unit, and a control unit for controlling the electric-power conversion unit; the electric-power conversion unit has an armature electric power conversion unit and a magnetic-field electric power conversion unit. The rotating machine unit, the electric-power conversion unit, and the control unit are mechanically integrated with one another. In the electric rotating machine and a control method for the electric rotating machine according to the preferred embodiment of the present invention, in the case where the electric rotating machine is made to function in the motor mode, the control unit controls the armature electric power conversion unit basically in such a way that the armature winding is energized with a rectangular wave current around the electric angle 180° and controls the magnetic-field electric power conversion unit so as to adjust the magnetic-field current. As a result, the rotating machine unit generates predetermined rotation torque in the rotor so as to perform engine starting and a torque assist. In the case where the electric rotating machine is made to function in the motor mode and the driving current becomes large, for example, while the electric rotating machine rotates at a low rotation speed, the control unit generates an armature power-conversion device driving signal based on, for example, a logic operation of a rectangular wave energization control signal and an armature duty control signal, and the armature power-conversion device driving signal drives the electric-power conversion device of the armature electric power conversion unit so that the armature winding is energized with an armature current around the electric angle 180°; as a result, the energization current to the armature winding is reduced. In the case where the electric rotating machine is made to function in the electric power generator mode and the inter-line induction voltage is the same as or smaller than the output voltage of the vehicle power source apparatus while the electric rotating machine generates electric power at a low rotation speed, the control unit generates the armature power-conversion device driving signal based on, for example, a logic multiplication of the rectangular wave energization control signal and the armature duty control signal, and the armature power-conversion device driving signal drives the electric-power conversion device of the armature electric power conversion unit so that the armature winding is energized with an armature current around the electric angle 180°; as a result, step-up electric power generation is implemented.

The electric rotating machine and the control method for the electric rotating machine according to the preferred embodiment of the present invention basically makes it possible to utilize a circuit configuration where the armature winding is energized with the rectangular wave current around the electric angle 180°. In the case where the driving current in the motor mode is suppressed and electric power is generated while the electric rotating machine rotates at a low rotation speed in the electric power generator mode, the armature power-conversion device driving signal is generated based on the logic operation of the armature duty control signal and the rectangular wave energization control signal for energizing the armature winding with a normal rectangular wave current around the electric angle 180°, and the electric-power conversion device of the armature electric power conversion unit is switching-controlled by the generated armature power-conversion device driving signal; the armature power-conversion device driving signal can be generated based on the logic operation of the armature duty control signal and the rectangular wave energization control signal for energizing the armature winding with a normal rectangular wave current around the electric angle 180°. Accordingly, the electric-power conversion unit and the control unit can be realized without being upsized and complicated. Moreover, without enlarging a cooling unit for cooling the electric-power conversion unit and the like and without reversing the direction of the magnetizing current for the magnetic-field winding of the electric rotating machine, the driving force, which is the output in the motor mode, and the power-generation output in the electric power generator mode can be enhanced. The electric rotating machine and the control method for the electric rotating machine according to the preferred embodiment of the present invention makes it possible to utilize the electric-power conversion unit and the control unit that perform energization control of the rectangular wave current, and hence the driving electric power is efficiently reduced; thus, a small-size and high-efficiency electric rotating machine can be obtained.

Hereinafter, an electric rotating machine and a control method for the electric rotating machine according to the present invention will be explained with reference to drawings, showing an example of electric rotating machine as a motor generator mounted, for example, in a vehicle. In each of the figures, the same or equivalent constituent elements are designated by the same reference characters. An electric rotating machine and a control method for the electric rotating machine according to the present invention are not limited to an electric rotating machine and a control method for the electric rotating machine to be mounted in a vehicle.

Embodiment 1

FIG. 1 is a block diagram illustrating an example of power source system of a vehicle equipped with an electric rotating machine according to Embodiment 1 of the present invention. In FIG. 1, an electric rotating machine 1 as a motor generator is configured with a rotating machine unit 2 including a rotor unit and a stator unit, an electric-power conversion unit 3 that functions as a backward converter (hereinafter, referred to as an inverter) or a forward converter (hereinafter, referred to as a converter), and a control unit 4 that receives a control command C from a higher-hierarchy control apparatus 103 formed of, for example, an engine control unit and controls the electric-power conversion unit 3. A rotor shaft (unillustrated) of the rotating machine unit 2 is mechanically connected with a crankshaft 6 of an engine 5 through a motive power transfer unit 7 formed of a belt or the like. The electric rotating machine 1 is electrically connected with a vehicle electric load 101 and a vehicle power source apparatus 102 such as a battery.

Figure 2:
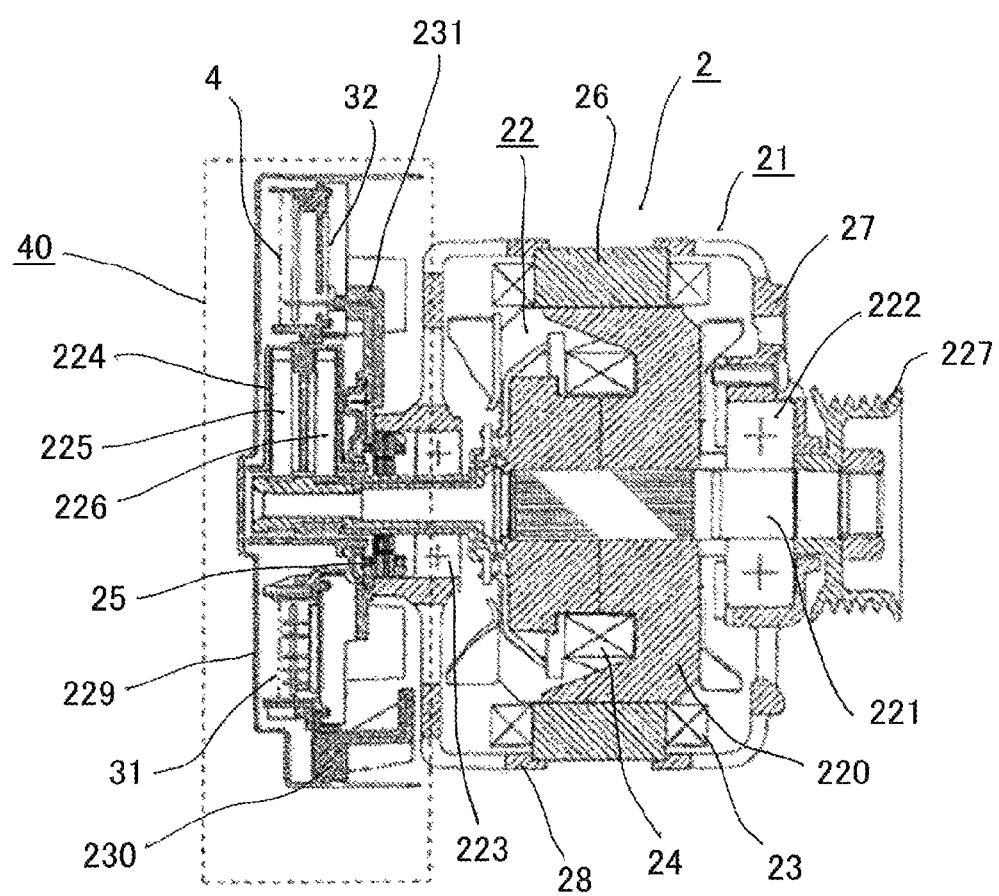
FIG. 2 is a cross-sectional view of the electric rotating machine according to Embodiment 1 of the present invention.

FIG. 2 is a cross-sectional view of the electric rotating machine according to Embodiment 1 of the present invention. In FIG. 2, the rotating machine unit 2 is provided with a stator iron core 26 formed of cylindrically laminated magnetic thin plates, a front bracket 27 and a rear bracket 28 that are arranged at the respective axis-direction both ends of the stator iron core 26 and support the stator iron core 26, an armature winding 23 mounted in slots (unillustrated) of the stator iron core 26, a claw-pole rotor iron core 220 that is inserted into a hollow portion of the stator iron core 26 and whose outer circumferential surface faces the inner circumferential surface of the stator iron core 26 through a predetermined gap, and a magnetic-field winding 24 fixed to the rotor iron core 220. A stator unit 21 of the rotating machine unit 2 includes the stator iron core 26 and the armature winding 23; a rotor unit 22 of the rotating machine unit 2 includes the rotor iron core 220 and the magnetic-field winding 24. The armature winding 23 is provided with, for example, a U-phase winding, a V-phase winding, and a W-phase winding that are connected with one another in a 3-phase Y-connection manner.

The rotating machine unit 2 is provided with a rotor shaft 221 that penetrates a center axis portion of the rotor iron core 220 and is fixed to the rotor iron core 220. The rotor shaft 221 is pivotably supported by the front bracket 27 and the rear bracket 28 through respective bearings 222 and 223. A brush holder 224 provided at an outer surface portion of the rear bracket 28 holds a pair of brushes 225 and 226 that makes contact with a pair of slip rings provided on the rotor shaft 221. A pulley 227 in the vicinity of an outer surface portion of the front bracket 27 is fixed to an axis-direction end of the rotor shaft 221 and is mechanically connected with the crankshaft 6 (refer to FIG. 1) of the engine through an unillustrated belt.

A controller unit 40 illustrated by a broken line includes the electric-power conversion unit 3, the control unit 4, and a rotation sensor unit 25 formed of a synchronized resolver or the like, and is disposed at the axis-direction end of the rear bracket 28. A cover 229 formed of an insulating material is provided in such a way as to cover the control unit 4, the electric-power conversion unit 3, the brush holder 224, the rotation sensor unit 25, and the axis-direction end of the rotor shaft 221.

An armature electric power conversion unit 31 included in the electric-power conversion unit 3 is provided with after-mentioned six power switching devices, as armature electric power conversion devices, mounted on a circuit board and a heat sink for cooling the power switching devices; the armature electric power conversion unit 31 is fixed to the rear bracket 28 through a supporting body 230 formed of an insulating material. A magnetic-field electric power conversion unit 32 included in the electric-power conversion unit 3 is provided with an after-mentioned magnetic-field switching device, as a magnetic-field electric power conversion device, and a reverse-current prevention diode that are mounted on a circuit board. The control unit 4 controls the six power switching devices in the armature electric power conversion unit 31 and the magnetic-field switching device in the magnetic-field electric power conversion unit 32, based on the control command C (refer to FIG. 1) from the foregoing higher-hierarchy control apparatus 103. The control unit 4 and the magnetic-field electric power conversion unit 32 are fixed to the rear bracket 28 through a supporting body 231 formed of an insulating material.

Figure 3:
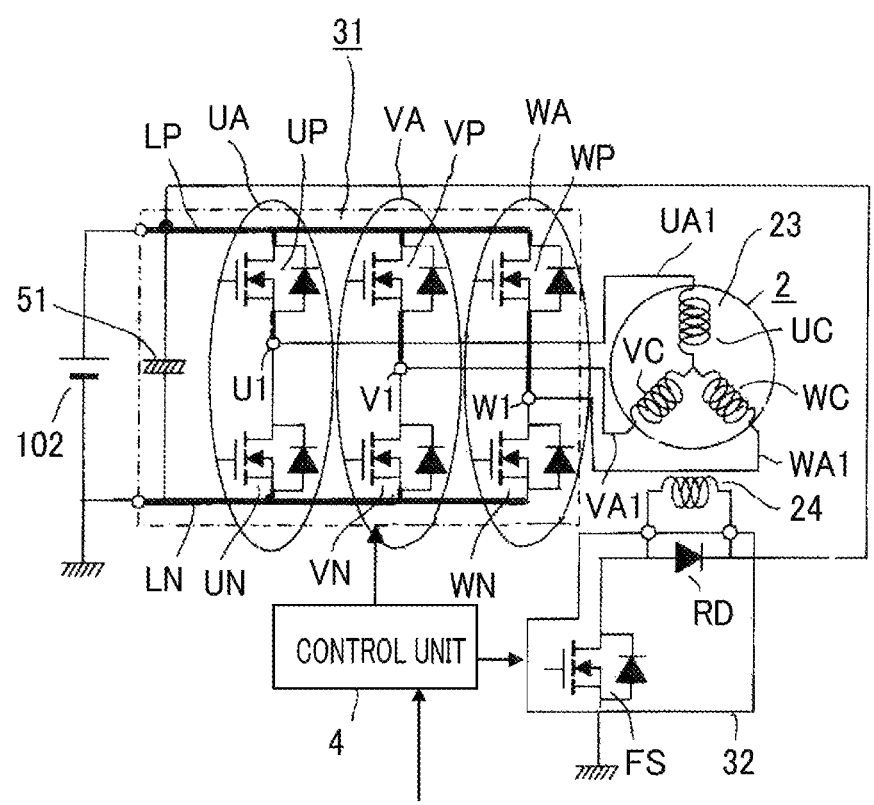
FIG. 3 is a circuit diagram of the electric rotating machine according to Embodiment 1 of the present invention.

FIG. 3 is a circuit diagram of the electric rotating machine according to Embodiment 1 of the present invention. In FIG. 3, the armature winding 23 of the rotating machine unit 2 is configured with a three-phase winding in which a U-phase winding UC, a V-phase winding VC, and a W-phase winding WC that are connected with one another in a Y-connection manner and the respective phases of which differ from one another by an electric angle of 120°. The U-phase winding UC, the V-phase winding VC, and the W-phase winding WC are energized with an after-mentioned armature current. The DC terminals of the armature electric power conversion unit 31 in the electric-power conversion unit 3 are connected with a vehicle power source apparatus 102 such as a battery mounted in the vehicle. The armature electric power conversion unit 31 is configured with a three-phase bridge circuit including a U-phase switching arm UA, a V-phase switching arm VA, and W-phase switching arm WA, and performs electric-power conversion between the vehicle power source apparatus 102 such as a battery and the armature winding 23.

The U-phase switching arm UA has a power switching device UP, as an electric-power conversion device, included in a U-phase positive-electrode-side switching arm of the armature electric power conversion unit 31 and a power switching device UN, as an electric-power conversion device, included in a U-phase negative-electrode-side switching arm. The V-phase switching arm VA has a power switching device VP, as an electric-power conversion device, included in a V-phase positive-electrode-side switching arm of the armature electric power conversion unit 31 and a power switching device VN, as an electric-power conversion device, included in a V-phase negative-electrode-side switching arm. The W-phase switching arm WA has a power switching device WP, as an electric-power conversion device, included in a W-phase positive-electrode-side switching arm of the armature electric power conversion unit 31 and a power switching device WN, as an electric-power conversion device, included in a W-phase negative-electrode-side switching arm.

Each of the foregoing power switching devices UP, UN, VP, VN, WP, and WN is a semiconductor device such as an IGB (Integrated Gate Bipolar Transistor) or a MOSFET (Metal Oxide Semiconductor Field Effect Transistor) and is formed of Si or SiC.

A pair of power switching devices UP and UN in the U-phase switching arm UA are connected in series with each other, and a series connection point U1 is connected with a U-phase terminal UA1 of the armature winding 23. A pair of power switching devices VP and VN in the V-phase switching arm VA are connected in series with each other, and a series connection point V1 is connected with a V-phase terminal VA1 of the armature winding 23. A pair of power switching devices WP and WN in the W-phase switching arm WA are connected in series with each other, and a series connection point W1 is connected with a W-phase terminal WA1 of the armature winding 23.

The respective power switching devices UP, VP, and WP included in the positive-electrode-side switching arms of the switching arms UA, VA, and WA for the corresponding phases are connected with one another through a positive-electrode-side wiring lead LP; the respective power switching devices UN, VN, and WN included in the negative-electrode-side switching arms are connected with one another through a negative-electrode-side wiring lead LN. A vehicle power source apparatus 102 such as a battery, as a DC power source, is connected between the positive-electrode-side wiring lead LP and the negative-electrode-side wiring lead LN. A smoothing capacitor 51 for smoothing DC ripple components in the armature electric power conversion unit 31 is connected between the positive-electrode-side wiring lead LP and the negative-electrode-side wiring lead LN, i.e., between the DC terminals of the armature electric power conversion unit 31.

The magnetic-field winding 24 of the rotating machine unit 2 is supplied with electric power from the magnetic-field electric power conversion unit 32 in the electric-power conversion unit 3. The magnetic-field current that flows in the magnetic-field winding 24 is controlled by switching operation performed by a magnetic-field switching device FS connected between the vehicle power source apparatus 102 such as a battery and the magnetic-field winding 24. The magnetic-field switching device FS is a semiconductor device such as an IGB or a MOSFET and is formed of Si or SiC. A reverse-flow prevention diode RD is connected across the magnetic-field winding 24. The armature electric power conversion unit 31 and the magnetic-field electric power conversion unit 32 are included in the electric-power conversion unit 3.

The control unit 4 controls the six power switching devices in the armature electric power conversion unit 31 and the magnetic-field switching device FS in the magnetic-field electric power conversion unit 32, based on the control command C from the foregoing higher-hierarchy control apparatus 103.

Figure 4:
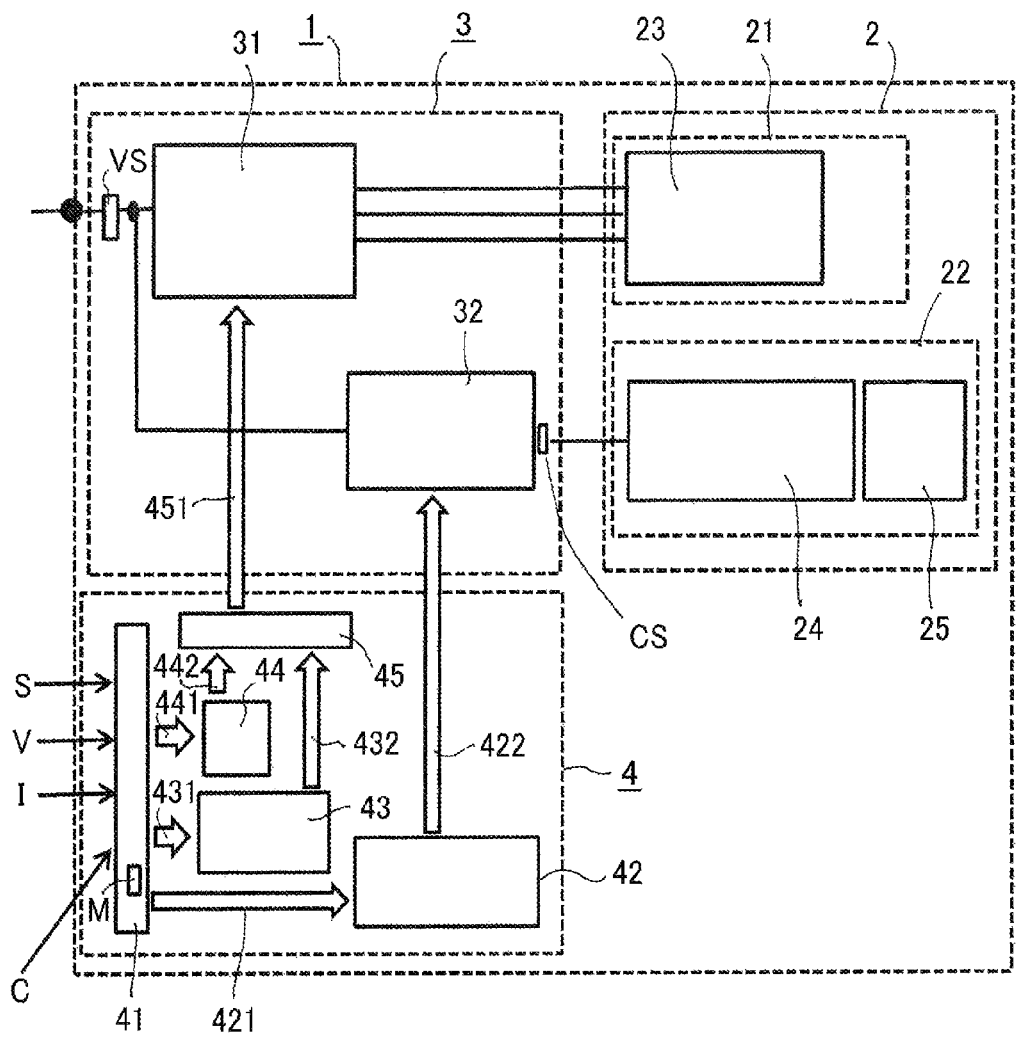
FIG. 4 is a control system diagram illustrating the configuration of a control system of the electric rotating machine according to Embodiment 1 of the present invention.

Next, the configuration of the control system, in the electric rotating machine according to the present invention, that has been illustrated in FIGS. 1, 2, and 3 will be explained. FIG. 4 is a control system diagram illustrating the configuration of the control system of the electric rotating machine according to Embodiment 1 of the present invention. In FIG. 4, the rotating machine unit 2 of the electric rotating machine 1 is provided with the magnetic-field winding 24 in the rotor unit 22; the stator unit 21 is provided with the armature winding 23. The rotation sensor unit 25, formed of a synchronized resolver or the like that detects the rotation speed or the like of the rotor unit 22, is integrated with the rotor unit 22.

The electric-power conversion unit 3 includes the magnetic-field electric power conversion unit 32 that performs energization control of the magnetic-field winding 24 and the armature electric power conversion unit 31 that performs energization control of the armature winding 23 and performs electric-power conversion between the vehicle power source apparatus 102 and the rotating machine unit 2.

By receiving the control command C from the higher-hierarchy control apparatus 103 (refer to FIG. 1), a rotation detection signal S including rotation speed information and rotation position information on the rotor unit 22, which can be obtained from the rotation sensor unit 25 provided in the rotor unit 22 of the rotating machine unit 2, a terminal voltage detection signal V on the electric rotating machine 1, which is obtained from a voltage sensor VS provided at the terminal unit, of the electric rotating machine 1, that is connected, for example, with the vehicle power source apparatus 102 and the vehicle electric load 101, and a magnetic-field current detection signal I, which is obtained from a current sensor CS provided in the magnetic-field electric power conversion unit 32 that supplies electric power to the magnetic-field winding 24 of the rotor unit 22, the control unit 4 controls the electric-power conversion unit 3. The control unit 4 has a calculation unit 41 including various kinds of memories M, a magnetic-field current duty signal generation circuit 42, a rectangular wave energization signal generation circuit 43, an armature duty signal generation circuit 44, and a signal processing unit 45.

The magnetic-field current duty signal generation circuit 42 in the control unit 4 generates a magnetic-field current duty control signal 422, which functions as a magnetic-field electric power conversion device driving signal for on/off-controlling the magnetic-field switching device FS in the magnetic-field electric power conversion unit 32, and provides the magnetic-field current duty control signal 422 to the magnetic-field electric power conversion unit 32. The magnetic-field switching device FS is on/off-controlled by the magnetic-field current duty control signal 422 so as to adjust the conduction rate (hereinafter, referred to as a magnetic-field current duty) of the magnetic-field current. The magnetic-field current duty signal generation circuit 42 performs feedback control of the magnetic-field current by on/off-controlling the magnetic-field switching device FS in such a way that the difference between the desired magnetic-field current value and a magnetic-field current value detected by the current sensor CS becomes zero.

The rectangular wave energization signal generation circuit 43 in the control unit 4 generates a rectangular wave energization control signal 432 corresponding to each of the power switching devices UP, UN, VP, VN, WP, and WN connected with the respective phases of the armature electric power conversion unit 31 and inputs the rectangular wave energization control signal 432 to the signal processing unit 45. The armature duty signal generation circuit 44 generates an after-mentioned armature duty control signal 442 and inputs the armature duty control signal 442 to the signal processing unit 45. The frequency of the armature duty control signal 442 is set to a frequency that is higher than that of the rectangular wave energization control signal 432, except for the case where the duty is 100[%].

The signal processing unit 45, for example, as described later, generates an armature power-conversion device driving signal 451 including a positive-electrode-side switching arm driving signal for driving the power switching device of the positive-electrode-side switching arm for each of the phases, obtained by calculating the logic multiplication of the rectangular wave energization control signal 432 and the armature duty control signal 442, and negative-electrode-side switching arm driving signal for driving the power switching device of the negative-electrode-side switching arm, obtained by calculating the logic addition of the rectangular wave energization control signal 432 and the armature duty control signal 442 and provides the armature power-conversion device driving signal 451 to the armature electric power conversion unit 31; then, the signal processing unit 45 on/off-controls the power switching devices UP, UN, VP, VN, WP, and WN for the respective phases in the armature electric power conversion unit 31 in such a way that the power switching devices alternately repeat the on-state and the off-state, for example, every electric angle 180°.

Figure 5:
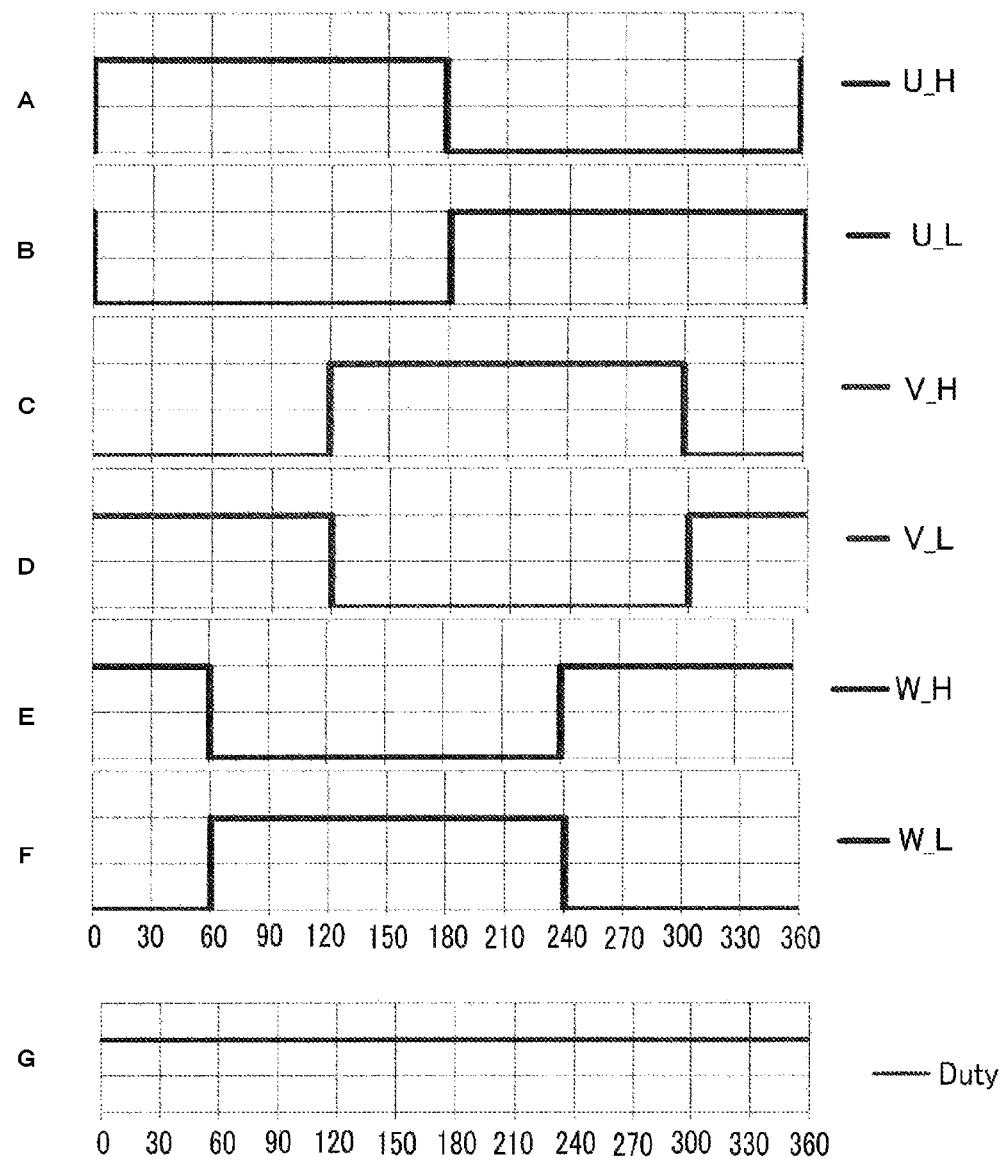
FIG. 5 is a set of waveform charts for explaining an armature power-conversion device driving signal in the electric rotating machine and a control method for the electric rotating machine according to Embodiment 1 of the present invention.

Here, the armature power-conversion device driving signal 451 that is provided from the signal processing unit 45 to the armature electric power conversion unit 31 will be explained. FIG. 5 is a set of waveform charts for explaining the armature power-conversion device driving signal in the electric rotating machine and the control method for the electric rotating machine according to Embodiment 1 of the present invention; there is represented a case where no element of duty control is added to the switching control of the armature electric power conversion device.

In FIG. 5, the chart "A" represents a rectangular wave energization control signal U_H to be utilized for the U-phase positive-electrode-side switching arm; in the range between the electric angle 0° and the electric angle 180°, "H"-level continues; in the range between the electric angle 180° and the electric angle 360°, "L"-level continues; thereafter, "H"-level and "L"-level are alternately repeated every electric angle 180°. The chart "B" represents a rectangular wave energization control signal UL to be utilized in the U-phase negative-electrode-side switching arm; in the range between the electric angle 0° and the electric angle 180°, "L"-level continues; in the range between the electric angle 180° and the electric angle 360°, "H"-level continues; thereafter, "L"-level and "H"-level are alternately repeated every electric angle 180°.

The chart "C" in FIG. 5 represents a rectangular wave energization control signal V_H to be utilized for the V-phase positive-electrode-side switching arm; the phase thereof is delayed by the electric angle 120° from the rectangular wave energization control signal U_H represented in the chart "A" in FIG. 5; "H"-level and "L"-level are alternately repeated every electric angle 180°. The chart "D" represents a rectangular wave energization control signal V_L to be utilized for the V-phase negative-electrode-side switching arm; the phase thereof is delayed by the electric angle 120° from the rectangular wave energization control signal U_L represented in the chart "B" in FIG. 5; "L"-level and "H"-level are alternately repeated every electric angle 180°.

The chart "E" in FIG. 5 represents a rectangular wave energization control signal W_H to be utilized for the W-phase positive-electrode-side switching arm; the phase thereof is delayed by the electric angle 240° from the rectangular wave energization control signal U_H represented in the chart "A" in FIG. 5; "H"-level and "L"-level are alternately repeated every electric angle 180°. The chart "F" represents a rectangular wave energization control signal W_L to be utilized for the W-phase negative-electrode-side switching arm; the phase thereof is delayed by the electric angle 240° from the rectangular wave energization control signal U_L represented in the chart "B" in FIG. 5; "L"-level and "H"-level are alternately repeated every electric angle 180°.

The chart "G" in FIG. 5 represents an armature duty control signal Duty. Each of the wave forms of the charts "A" through "G" in FIG. 5 represents the waveform in one cycle of the electric angle.

Each of the rectangular wave energization control signals represented in the charts "A" through "F" in FIG. 5 corresponds to the rectangular wave energization control signal 432 generated by the rectangular wave energization signal generation circuit 43. The armature duty control signal represented in the chart "G" of FIG. 5 corresponds to the armature duty control signal 442 generated by the armature duty signal generation circuit 44 in FIG. 4.

In the case where no element of duty control is added to the switching control of the armature electric power conversion device, the duty ratio of "H"-level to "L"-level of the armature duty control signal 442 generated by the armature duty signal generation circuit 44 is 100[%], as represented in the chart "G" of FIG. 5; the armature duty control signal 442 is a fixed value of "H"-level. In the case where no element of duty control is added to the switching control of the armature electric power conversion device, the signal processing unit 45 generates the armature power-conversion device driving signal 451 for each of the power switching devices by calculating the logic multiplication of the rectangular wave energization control signal 432 and the armature duty control signal 442; the generated armature power-conversion device driving signal 451 for each of the power switching devices is a signal having the same wave form as the corresponding one of rectangular wave energization control signals U_H, U_L, V_H, V_L, W_H, and W_L represented in the charts "A" through "F".

Each of the power switching devices UP, UN, VP, VN, WP, and WN for the respective phases is controlled by the armature power-conversion device driving signal 451 in such a way as to alternately repeat the on-state and the off-state every electric angle 180°. As a result, each of the U-phase winding, the V-phase winding, and the W-phase winding of the armature winding 23 is alternately energized with a positive and a negative rectangular wave current every electric angle 180°. In the present embodiment, such an energization control of the armature winding will be referred to as "180°-electric-angle rectangular wave energization control".

1. The Motor-Mode Operation of the Electric Rotating Machine and the Control Method Therefor:

At first, the motor-mode operation of the electric rotating machine and the control method therefor will be explained. In the present embodiment, there will be described a case where the electric rotating machine is made to function in the motor mode so as to start the engine 5 or the electric rotating machine is made to function in the motor mode while it rotates at a low rotation speed, and, especially, the output voltage of the vehicle power source apparatus 102 is high and the impedance of the electric rotating machine 1 is low. When the control command C for making the electric rotating machine 1 function in the motor mode so as to start the engine 5 or the control command C for making the electric rotating machine 1 function in the motor mode while it rotates at a low rotation speed is provided from the higher-hierarchy control apparatus 103 to the calculation unit 41 of the control unit 4, the calculation unit 41, as described above, calculates the magnetic-field current duty control command 421, based on a torque command included in the control command C, the rotation detection signal S, the terminal voltage detection signal V, and the magnetic-field current detection signal I and provides the magnetic-field current duty control command 421 to the magnetic-field current duty signal generation circuit 42.

The magnetic-field current duty signal generation circuit 42 generates the magnetic-field current duty control signal 422, which functions as the magnetic-field electric power conversion device driving signal corresponding to the magnetic-field current duty control command 421 provided from the calculation unit 41, and provides the magnetic-field current duty control signal 422 to the magnetic-field electric power conversion unit 32 in the electric-power conversion unit 3. The magnetic-field switching device FS of the magnetic-field electric power conversion unit 32 is on/off-controlled by the provided magnetic-field current duty control signal 422. Accordingly, the magnetic-field current flowing in the magnetic-field winding 24 is controlled so as to be a predetermined magnetic-field current value commanded by the control command C.

Based on the torque command included in the control command C, the rotation detection signal S, and the terminal voltage detection signal V, the calculation unit 41 calculates a rectangular wave energization control command 431 and an armature duty control command 441 and provides the calculated rectangular wave energization control command 431 and the calculated armature duty control command 441 to the rectangular wave energization signal generation circuit 43 and the armature duty signal generation circuit 44, respectively. The rectangular wave energization signal generation circuit 43 that has received the rectangular wave energization control command 431 generates the rectangular wave energization control signal 432, based on the rectangular wave energization control command 431, and inputs the rectangular wave energization control signal 432 to the signal processing unit 45. The armature duty signal generation circuit 44 that has received the armature duty control command 441 generates the armature duty control signal 442, based on the armature duty control command 441, and inputs the armature duty control signal 442 to the signal processing unit 45.

The signal processing unit 45 performs a logic operation of the inputted rectangular wave energization control signal 432 and armature duty control signal 442 and then provides the armature power-conversion device driving signal 451, generated by the logic operation, to the respective control electrodes of the power switching devices UP, UN, VP, VN, WP, and WN of the armature electric power conversion unit 31.

Figure 6A:
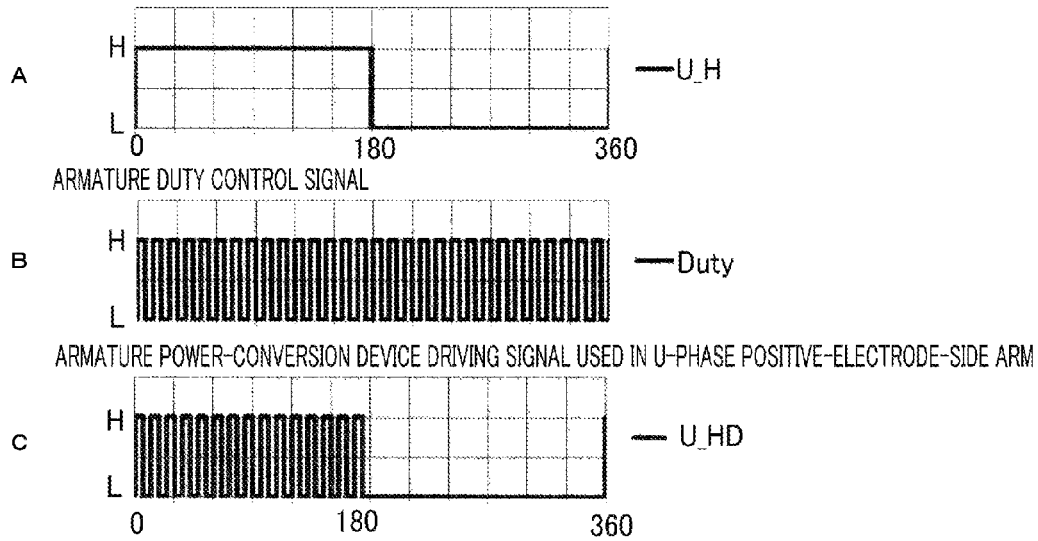
FIG. 6A is a set of waveform charts for explaining the armature power-conversion device driving signal in the electric rotating machine and the control method for the electric rotating machine according to Embodiment 1 of the present invention.
Figure 6B:
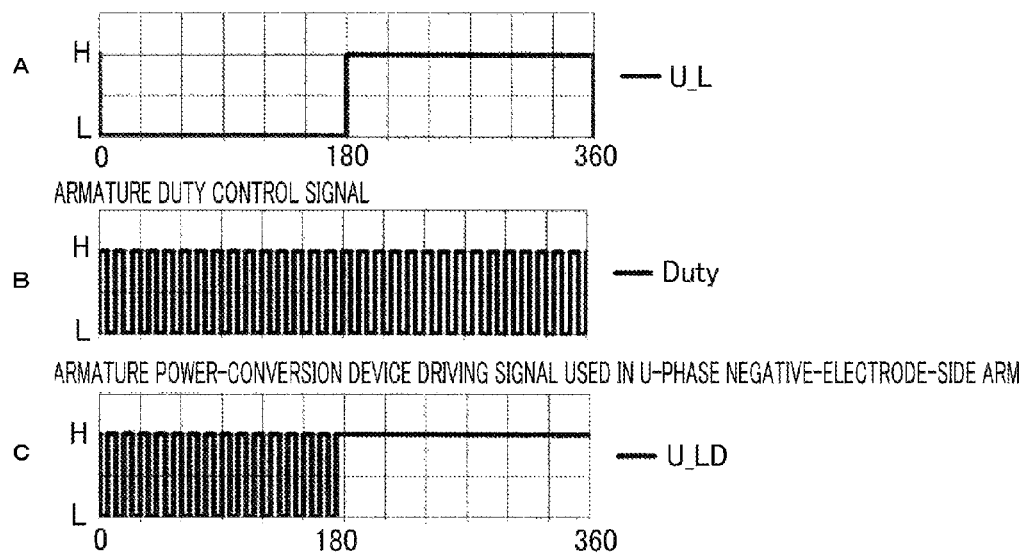
FIG. 6B is a set of waveform charts for explaining the armature power-conversion device driving signal in the electric rotating machine and the control method for the electric rotating machine according to Embodiment 1 of the present invention.

Here, the armature power-conversion device driving signal 451 that is provided from the signal processing unit 45 to the armature electric power conversion unit 31 will be explained. Each of FIGS. 6A and 6B is a set of waveform charts for explaining the armature power-conversion device driving signal in the electric rotating machine and the control method for the electric rotating machine according to Embodiment 1 of the present invention; each of FIGS. 6A and 6B represents a case where the electric rotating machine is made to function in the motor mode so as to start the engine 5 or the electric rotating machine is made to function in the motor mode while it rotates at a low rotation speed. In the case where the electric rotating machine is made to function in the motor mode so as to start the engine 5 or the electric rotating machine is made to function in the motor mode while it rotates at a low rotation speed, the element of duty control is added to the switching control of the armature electric power conversion device.

The chart "A" in FIG. 6A represents the rectangular wave energization control signal U_H to be utilized in the U-phase positive-electrode-side arm; in the range between the electric angle 0° and the electric angle 180°, "H"-level continues; in the range between the electric angle 180° and the electric angle 360°, "L"-level continues; thereafter, "H"-level and "L"-level are alternately repeated every electric angle 180°. The chart "B" in FIG. 6A represents the armature duty control signal Duty; "H"-level and "L"-level are alternately repeated every predetermined cycle; the duty ratio of the "H"-level to "L"-level is set to 50[%]. The chart "C" in FIG. 6A represents an armature power-conversion device driving signal U_HD, which is generated by calculating the logic multiplication of the rectangular wave energization control signal U_H represented in the chart "A" and the armature duty control signal Duty represented in the chart "B" and functions as the U-phase positive-electrode-side switching arm driving signal to be utilized in the U-phase positive-electrode-side switching arm. In the range between the electric angle 0° and the electric angle 180°, "H"-level and "L"-level are alternately repeated every predetermined cycle; in the range between the electric angle 180° and the electric angle 360°, "L"-level continues. Each of the charts "A", "B", and "C" in FIG. 6A represents the wave form in one cycle of the electric angle.

The chart "A" in FIG. 6B represents the rectangular wave energization control signal U_L to be utilized in the U-phase negative-electrode-side arm; in the range between the electric angle 0° and the electric angle 180°, "L"-level continues; in the range between the electric angle 180° and the electric angle 360°, "H"-level continues; thereafter, "L"-level and "H"-level are alternately repeated every electric angle 180°. The chart "B" in FIG. 6B represents the armature duty control signal Duty that is the same as the armature duty control signal Duty represented in the chart "A" in FIG. 6A. The chart "C" in FIG. 6B represents an armature power-conversion device driving signal U_LD, which is generated by calculating the logic addition of the rectangular wave energization control signal U_L represented in the chart "A" and the armature duty control signal Duty represented in the chart "B" and functions as the U-phase negative-electrode-side switching arm driving signal to be utilized in the U-phase negative-electrode-side switching arm. In the range between the electric angle 0° and the electric angle 180°, "H"-level and "L"-level are alternately repeated every predetermined cycle; in the range between the electric angle 180° and the electric angle 360°, "H"-level continues. Each of the charts "A", "B", and "C" in FIG. 6B represents the wave form in one cycle of the electric angle.

The rectangular wave energization control signal V_H (not represented) to be utilized in the V-phase positive-electrode-side switching arm and the armature power-conversion device driving signal V_HD (not represented) to be utilized in the V-phase positive-electrode-side switching arm are the same as the rectangular wave energization control signal U_H represented in the chart "A" in FIG. 6A and the armature power-conversion device driving signal U_HD represented in the chart "C" in FIG. 6A, respectively, except for having the respective waveforms whose phases are delayed by the electric angle 120° from the respective phases of the rectangular wave energization control signal U_H and the armature power-conversion device driving signal U_HD, respectively. The rectangular wave energization control signal V_L (not represented) to be utilized in the V-phase negative-electrode-side switching arm and the armature power-conversion device driving signal V_LD (not represented) to be utilized in the V-phase negative-electrode-side switching arm are the same as the rectangular wave energization control signal UL represented in the chart "A" in FIG. 6B and the armature power-conversion device driving signal U_LD represented in the chart "C" in FIG. 6B, respectively, except for having the respective waveforms whose phases are delayed by the electric angle 120° from the respective phases of the rectangular wave energization control signal U_L and the armature power-conversion device driving signal U_LD, respectively.

The rectangular wave energization control signal W_H (not represented) to be utilized in the W-phase positive-electrode-side switching arm and the armature power-conversion device driving signal W_HD (not represented) to be utilized in the W-phase positive-electrode-side switching arm are the same as the rectangular wave energization control signal UH represented in the chart "A" in FIG. 6A and the armature power-conversion device driving signal U_HD represented in the chart "C" in FIG. 6A, respectively, except for having the respective waveforms whose phases are delayed by the electric angle 240° from the respective phases of the rectangular wave energization control signal U_H and the armature power-conversion device driving signal U_HD, respectively. The rectangular wave energization control signal W_L (not represented) to be utilized in the W-phase negative-electrode-side switching arm and the armature power-conversion device driving signal W_LD (not represented) to be utilized in the W-phase negative-electrode-side switching arm are the same as the rectangular wave energization control signal UL represented in the chart "A" in FIG. 6B and the armature power-conversion device driving signal U_LD represented in the chart "C" in FIG. 6B, respectively, except for having the respective waveforms whose phases are delayed by the electric angle 240° from the respective phases of the rectangular wave energization control signal U_L and the armature power-conversion device driving signal U_LD, respectively.

The signal processing unit 45 calculates the logic multiplication of the rectangular wave energization control signal UH, represented in the chart "A" in FIG. 6A and to be utilized in the U-phase positive-electrode-side switching arm, and the armature duty control signal Duty represented in the chart "B" in FIG. 6A so as to generate the armature power-conversion device driving signal U_HD, represented in the chart "C" in FIG. 6A and to be utilized in the U-phase positive-electrode-side switching arm; the armature power-conversion device driving signal U_HD generated through the calculation of the logic multiplication has a waveform that alternately repeats, in the range between the electric angle 0° and the electric angle 180°, "H"-level and the "L"-level every predetermined cycle at the duty ratio 50[%], which is the same as the duty ratio of the armature duty control signal Duty represented in the chart "B" in FIG. 6A, and that continues "L"-level in the range between the electric angle 180° and the electric angle 360°.

The signal processing unit 45 calculates the logic addition of a signal obtained by reversing the rectangular wave energization control signal U_L, represented in the chart "A" in FIG. 6B and to be utilized in the U-phase negative-electrode-side switching arm, and a signal obtained by reversing the armature duty control signal Duty represented in the chart "B" in FIG. 6B so as to generate the armature power-conversion device driving signal U_LD, represented in the chart "C" in FIG. 6B and to be utilized in the U-phase negative-electrode-side switching arm; the armature power-conversion device driving signal U_LD generated through the calculation of the logic addition has a waveform that alternately repeats, in the range between the electric angle 0° and the electric angle 180°, "H"-level and the "L"-level every predetermined cycle with the duty ratio 50[%], which is the same as the duty ratio of the armature duty control signal Duty represented in the chart "B" in FIG. 6B, and that continues "H"-level in the range between the electric angle 180° and the electric angle 360°.

The V-phase armature power-conversion device driving signals V_HD and V_LD have the respective waveforms whose phases are delayed by the electric angle 120° from the respective waveforms of the U-phase armature power-conversion device driving signals U_HD and U_LD, respectively. The W-phase armature power-conversion device driving signals W_HD and W_LD have the respective waveforms whose phases are delayed by the electric angle 240° from the respective waveforms of the U-phase armature power-conversion device driving signals U_HD and U_LD, respectively.

Figure 7:
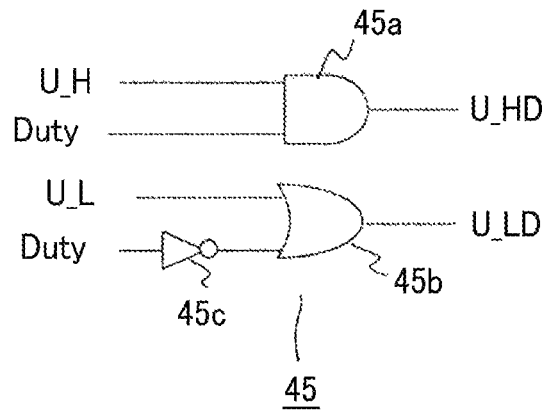
FIG. 7 is a circuit diagram illustrating an example of configuration of a signal processing unit in the electric rotating machine according to Embodiment 1 of the present invention.

FIG. 7 is a circuit diagram illustrating an example of configuration of the signal processing unit in the electric rotating machine according to Embodiment 1 of the present invention. In FIG. 7, an AND circuit 45a receives the rectangular wave energization control signal U_H, represented in the chart "A" in FIG. 6A and to be utilized in the U-phase positive-electrode-side switching arm, and the armature duty control signal Duty represented in the chart "B" in FIG. 6A and then outputs the armature power-conversion device driving signal U_HD, which is obtained by calculating the logic multiplication of these signals, represented in the chart "C" in FIG. 6A, and is utilized in the U-phase positive-electrode-side switching arm.

Also for the V phase, the signal processing unit 45 has an AND circuit (unillustrated) that is the same as the AND circuit 45a in FIG. 7; the AND circuit receives the rectangular wave energization control signal V_H (not represented) to be utilized in the V-phase positive-electrode-side switching arm and the armature duty control signal Duty represented in the chart "B" in FIG. 6A and then outputs the armature power-conversion device driving signal V_HD (not represented), which is obtained by calculating the logic multiplication of these signals and is utilized in the V-phase positive-electrode-side switching arm.

Furthermore, also for the W phase, the signal processing unit 45 has an AND circuit (unillustrated) that is the same as the AND circuit 45a in FIG. 7; the AND circuit receives the rectangular wave energization control signal W_H (not represented) to be utilized in the W-phase positive-electrode-side switching arm and the armature duty control signal Duty represented in the chart "B" in FIG. 6A and then outputs the armature power-conversion device driving signal W_HD (not represented), which is obtained by calculating the logic multiplication of these signals and is utilized in the W-phase positive-electrode-side switching arm.

In FIG. 7, an OR circuit 45b receives the rectangular wave energization control signal U_L, represented in the chart "A" in FIG. 6B and to be utilized in the U-phase negative-electrode-side switching arm, and a signal obtained by reversing, through a NOT circuit 45c, the armature duty control signal Duty represented in the chart "B" in FIG. 6B and then outputs the armature power-conversion device driving signal U_LD, which is obtained by calculating the logic addition of these signals, represented in the chart "C" in FIG. 6B, and is utilized in the U-phase negative-electrode-side switching arm.

Moreover, also for the V phase, the signal processing unit 45 has an OR circuit (unillustrated) and a NOT circuit (unillustrated) that are the same as the OR circuit 45b and the NOT circuit 45c in FIG. 7; the OR circuit receives the rectangular wave energization control signal V_L (not represented) to be utilized in the V-phase negative-electrode-side switching arm and a signal obtained by reversing, through the NOT circuit, the armature duty control signal Duty represented in the chart "B" in FIG. 6A and then outputs the armature power-conversion device driving signal V_LD (not represented), which is obtained by calculating the logic multiplication of these signals and is utilized in the V-phase negative-electrode-side switching arm.

Furthermore, also for the W phase, the signal processing unit 45 has an OR circuit (unillustrated) and a NOT circuit (unillustrated) that are the same as the OR circuit 45b and the NOT circuit 45c in FIG. 7; the OR circuit receives the rectangular wave energization control signal W_L (not represented) to be utilized in the W-phase negative-electrode-side switching arm and a signal obtained by reversing, through the NOT circuit, the armature duty control signal Duty represented in the chart "B" in FIG. 6A and then outputs the armature power-conversion device driving signal W_LD (not represented), which is obtained by calculating the logic multiplication of these signals and is utilized in the W-phase negative-electrode-side switching arm.

The rectangular wave energization signal generation circuit 43 and the armature duty signal generation circuit 44 are separately controlled by the calculation unit 41. Therefore, it is not necessarily required that the armature duty control signal 442 is a duty signal corresponding to the rectangular wave section (the "H"-level section) of the rectangular wave energization control signal 432. It is only necessary that the armature duty control signal 442 is a signal that has a frequency higher than that of the rectangular wave energization control signal 432, that alternately repeats "H"-level and "L"-level, and that has an appropriate duty ratio.

As described above, the calculation unit 41 in the control unit calculates the magnetic-field current duty control command 421, based on the torque command included in the control command C, the rotation detection signal S, the terminal voltage detection signal V, and the magnetic-field current detection signal I, and provides the magnetic-field current duty control command 421 to the magnetic-field current duty signal generation circuit 42. Moreover, based on the torque command included in the control command C, the rotation detection signal S, and the terminal voltage detection signal V, the calculation unit 41 calculates the rectangular wave energization control command 431 and the armature duty control command 441 and provides the calculated rectangular wave energization control command 431 and the calculated armature duty control command 441 to the rectangular wave energization signal generation circuit 43 and the armature duty signal generation circuit 44, respectively.

In this situation, it may be allowed that any one of the magnetic-field current duty control command 421 and the armature duty control command 441 is calculated based on a driving duty map preliminarily stored in the memory M of the calculation unit 41.

As described above, in the case where the electric rotating machine is made to function in the motor mode so as to start the engine 5 or in the case where the electric rotating machine is made to function in the motor mode while it rotates at a low rotation speed, there is utilized a switching method, for the armature electric power conversion devices, that is obtained by adding the element of duty control to the 180°-electric-angle rectangular wave energization control; as a result, based on the duty control, a voltage is intermittently applied to the armature winding; thus, the voltage applied to the armature winding decreases and hence the current is reduced.

Figure 8:
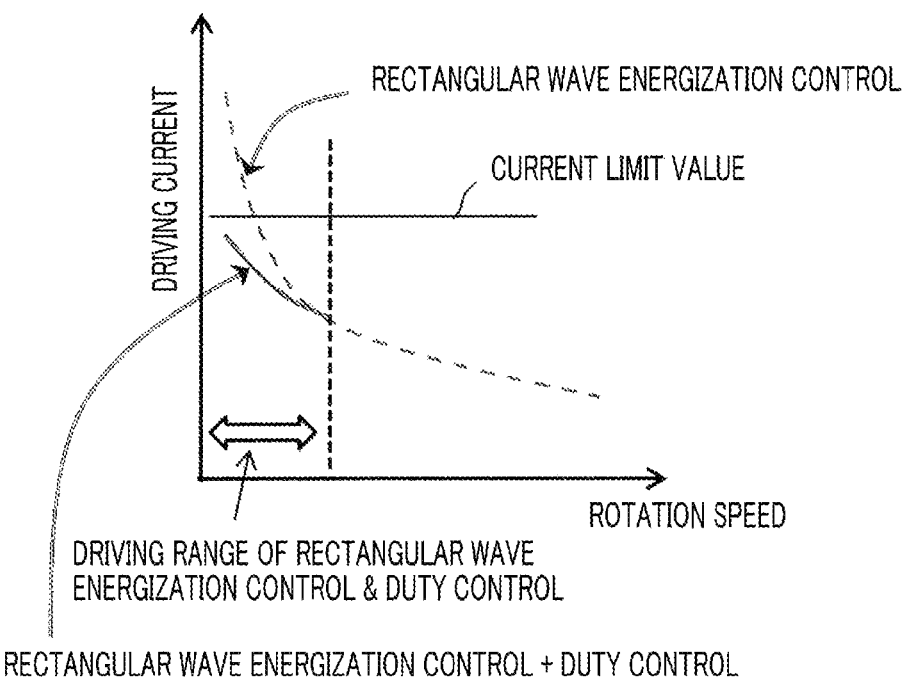
FIG. 8 is an explanatory graph representing the relationship between the rotation speed and the driving current at a time when the electric rotating machine functions in the motor mode in the electric rotating machine and the control method for the electric rotating machine according to Embodiment 1 of the present invention.

FIG. 8 is an explanatory graph representing the relationship between the rotation speed and the driving current at a time when the electric rotating machine functions in the motor mode in the electric rotating machine and the control method for the electric rotating machine according to Embodiment 1 of the present invention; the ordinate denotes the driving current for the electric rotating machine, and the abscissa denotes the rotation speed (the number of rotations per unit time) of the electric rotating machine. The driving current denotes a DC current that is supplied from the vehicle power source apparatus 102 to the power switching devices of the armature electric power conversion unit 31. As represented by a broken line in FIG. 8, in comparison with the case where the armature electric power conversion unit is controlled only by "rectangular wave energization control" over the whole range of the rotation speed, the armature current can be reduced, as represented by a solid line, by performing "rectangular wave energization control+ duty control". As a result, the armature current can be reduced, for example, to a current limit value or smaller.

Here, as described above, the driving range of the "rectangular wave energization control+duty control" represented in FIG. 8 denotes, for example, the range of the rotation speed (the number of rotations) of the electric rotating machine at a time when the electric rotating machine is made to function in the motor mode so as to start the engine or at a time when the electric rotating machine is made to function in the motor mode while it rotates at a low rotation speed. The driving range of the "rectangular wave energization control+duty control" is not limited to the foregoing case.

Furthermore, when the duty ratio in the duty control is changed, it is made possible to adjust the voltage applied to the armature winding. In this situation, the value of the duty ratio is determined based on the rotation speed or the number of rotations to be detected by the rotation sensor unit 25; alternatively, the value of the duty ratio is determined based on the rotation speed or the number of rotations and the inter-terminal voltage of the electric rotating machine to be detected by the voltage sensor VS.

At least the calculation unit 41 in the control unit 4 can be formed of a processor having the memory M. Accordingly, it may be allowed that a driving duty map that represents the relationship between the rotation speed or the number of rotations to be detected by the rotation sensor unit 25 and the duty ratio determined based on the rotation speed or the number of rotations or a driving duty map that represents the relationship between the rotation speed or the number of rotations and the duty ratio determined based on the rotation speed or the number of rotations and the inter-terminal voltage of the electric rotating machine 1 to be detected by the voltage sensor VS is preliminarily stored in the memory M of the calculation unit 41, and then, in accordance with the operation condition of the electric rotating machine, the duty ratio is changed based on the stored driving duty map.

2. The Operation of the Electric Rotating Machine in the Motor Mode and the Control Method Therefor:

Next, the motor-mode operation of the electric rotating machine and the control method therefor will be explained. In the case of normal power generation in the electric power generator mode, the motive power from the engine 5 rotates the rotor unit 22; under the condition that the rotation speed of the rotor unit 22 is rather high, the magnetic-field winding 24 is energized with a magnetic-field current; magnetic flux generated by the rotor unit 22 is interlinked with the armature winding 23 of the stator unit 21; thus, an induction voltage is generated across the armature winding as a stator winding. In the case where the induction voltage exceeds the output voltage of the vehicle power source apparatus 102, the power switching devices UP, UN, VP, VN, WP, and WN, which are electric-power conversion devices in the positive-electrode-side switching arms and the negative-electrode-side switching arms for the respective phases in the armature electric power conversion unit 31, are appropriately turned on or off in accordance with the voltage phase, so that AC electric power generated by the electric rotating machine 1 is outputted to the armature electric power conversion unit 31. The armature electric power conversion unit 31 converts the AC electric power from the electric rotating machine 1 into DC electric power so as to charge the vehicle power source apparatus 102 therewith and supplies the DC electric power obtained through the conversion to the vehicle electric load 101.

However, in the case where the rotation speed of the electric rotating speed 1 is low or the number of rotations thereof is small, the voltage generated across the armature winding 23 cannot exceed the output voltage of the vehicle power source apparatus 102 because the number of rotations of the rotor unit 22 is small, even when the magnetic-field winding 24 is energized with the magnetic-field current so that the magnetic flux generated by the rotor unit 22 is interlinked with the armature winding 23 of the stator unit 21.

Accordingly, in the case where the rotation speed of the electric rotating speed 1 is low or the number of rotations thereof is small, the element of duty control is added to the 180°-electric-angle rectangular wave energization control, as is the foregoing case where the electric rotating machine 1 is made to function in the motor mode. As a result, it is made possible to utilize the armature winding 23 and the armature electric power conversion unit 31 so that they perform the same operation as that of a step-up DC/DC converter; therefore, the electric rotating machine 1 can generate electric power. In other words, the electric-power conversion unit 3 can be controlled in the same manner as in the case of the foregoing motor mode; thus, electric power can be generated without adding any new circuits and control units.

In the case of the control in the electric power generator, the magnetic-field current detection signal I, the voltage phase shifting amount, the armature duty control, and the like are commanded based on the control command C; thus, also in this sense, the control in the electric power generator is the same as the control in the motor mode. Therefore, unlike the apparatus disclosed in Patent Document 1, electric power can be generated without reversing the magnetization direction of the magnetic-field current.

Figure 9:
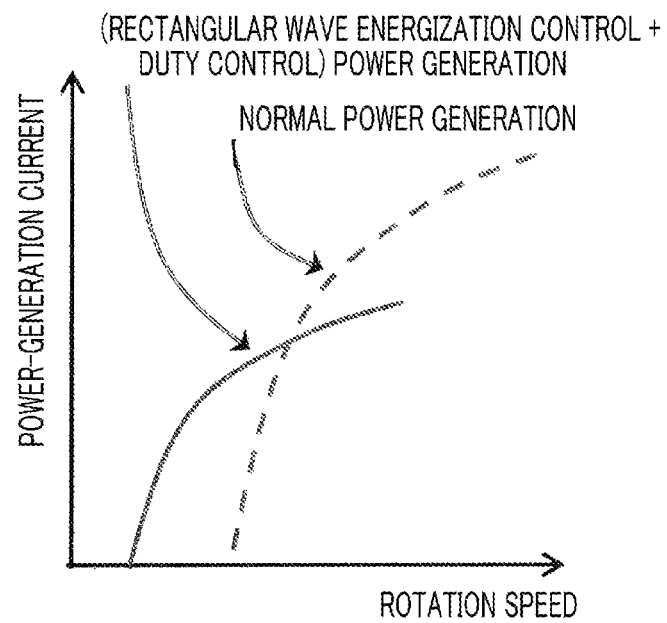
FIG. 9 is an explanatory graph representing the relationship between the rotation speed and the power-generation current at a time when the electric rotating machine functions in the electric power generator mode in the electric rotating machine and the control method for the electric rotating machine according to Embodiment 1 of the present invention.

FIG. 9 is an explanatory graph representing the relationship between the rotation speed and the power-generation current at a time when the electric rotating machine functions in the electric power generator mode in the electric rotating machine and the control method therefor according to Embodiment 1 of the present invention; the ordinate denotes the power-generation current, and the abscissa denotes the rotation speed (the number of rotations per unit time) of the electric rotating machine. Here, the power-generation current denotes a DC current that is supplied from the armature electric power conversion unit 31 to the vehicle power source apparatus 102. It can be seen that in comparison with the normal power generation represented by a broken line in FIG. 9, electric power can be generated at a low rotation speed by adding the duty control to the rectangular wave energization control, as represented by a solid line.

Figure 10:
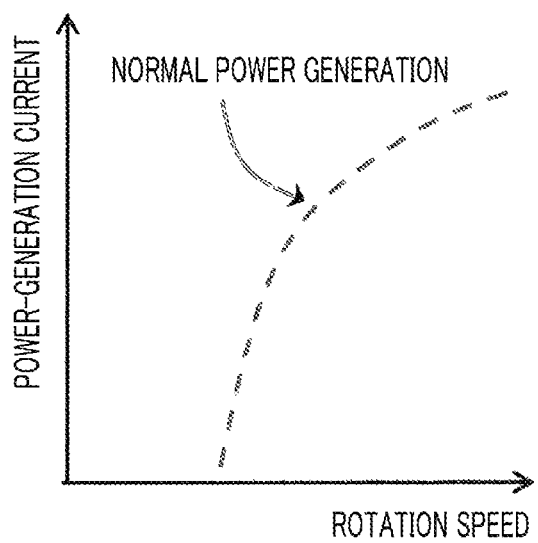
FIG. 10 is an explanatory graph representing the relationship between the rotation speed and the power-generation current at a time when a conventional electric rotating machine functions in the electric power generator mode.

FIG. 10 is an explanatory graph representing the relationship between the rotation speed and the power-generation current at a time when a conventional electric rotating machine functions in the electric power generator mode; the ordinate and the abscissa correspond to the ordinate and the abscissa of FIG. 9. As represented in FIG. 10, in the electric power generator mode of the conventional electric rotating machine, only the 180°-electric-angle rectangular wave energization control represented in the broken line in FIG. 9 is performed. Therefore, in the case where the rotation speed of the electric rotating speed 1 is low or the number of rotations thereof is small, the voltage generated across the armature winding 23 cannot exceed the output voltage of the vehicle power source apparatus 102 because the number of rotations of the rotor unit 22 is small, even when the magnetic-field winding 24 is energized with the magnetic-field current so that the magnetic flux generated by the rotor unit 22 is interlinked with the armature winding 23 of the stator unit 21.

In the electric power generator mode of the electric rotating machine according to Embodiment 1 of the present invention, as is the case of the foregoing motor mode, the calculation unit 41 calculates the magnetic-field current duty control command 421, based on the control command C, the rotation detection signal S, the terminal voltage detection signal V, and the magnetic-field current detection signal I, and provides the magnetic-field current duty control command 421 to the magnetic-field current duty signal generation circuit 42. Moreover, based on the control command C, the rotation detection signal S, and the terminal voltage detection signal V, the calculation unit 41 calculates the rectangular wave energization control command 431 and the armature duty control command 441 and provides the calculated rectangular wave energization control command 431 and the calculated armature duty control command 441 to the rectangular wave energization signal generation circuit 43 and the armature duty signal generation circuit 44, respectively.

Furthermore, when the duty ratio in the duty control is changed, it is made possible to adjust the generation voltage across the armature winding. In this situation, the value of the duty ratio is determined based on the rotation speed or the number of rotations to be detected by the rotation sensor unit 25; alternatively, the value of the duty ratio is determined based on the rotation speed or the number of rotations and the inter-terminal voltage of the electric rotating machine to be detected by the voltage sensor VS.

At least the calculation unit 41 in the control unit 4 can be formed of a processor having the memory M. Accordingly, it may be allowed that a driving duty map that represents the relationship between the rotation speed or the number of rotations to be detected by the rotation sensor unit 25 and the duty ratio determined based on the rotation speed or the number of rotations or a driving duty map that represents the relationship between the rotation speed or the number of rotations and the duty ratio determined based on the rotation speed or the number of rotations and the inter-terminal voltage of the electric rotating machine 1 to be detected by the voltage sensor VS is preliminarily stored in the memory M of the calculation unit 41, and then, in accordance with the operation condition of the electric rotating machine, the duty ratio is changed based on the stored driving duty map.

With regard to the foregoing electric rotating machine and the control method therefor according to the present invention, it has been explained that in both the motor mode and the electric power generator mode, the armature duty control is added to the 180°-electric-angle rectangular wave energization control; however, it may be allowed that instead of the 180° energization control, arbitrary-electric-angle rectangular wave energization control is utilized.

In addition, it may be allowed that when the control including the armature duty control added to the rectangular wave energization control is performed, the respective upper-limit numbers of rotations or the respective upper-limit rotation speeds of the electric rotating machine are separately set for the motor mode and the electric power generator mode. In this case, when both a motor-mode duty map and an electric-power-generator-mode duty map are provided, the upper-limit number of rotations or the upper-limit rotation speed of the electric rotating machine can separately be set for each of the duty maps.

Moreover, in the case where the electric rotating machine is made to function in the electric power generator mode and the control including the armature duty control added to the 180°-electric-angle rectangular wave energization control is performed, it is also made possible to control the power-generation current by preliminarily setting a set of the armature duty, the magnetic-filed current, and the phase of the armature voltage in the duty map and then, in accordance with the operation condition of the electric rotating machine, fixing one item of the armature duty, the magnetic-filed current, and the phase of the armature voltage while adjusting the residual two items, as variable ones.

In the case where the electric rotating machine is made to function in the electric power generator mode, it may be allowed that in the range of the same rotation speed or the same number of rotations as that of the normal power generation, there is performed electric power generation in which respective parasitic diodes included in the power switching devices, as armature electric power conversion devices, are utilized so as to perform rectification. This method eliminates the necessity of generating the on/off signal for each of the power switching devices; therefore, the control can be simplified.

Furthermore, with regard to the electric rotating machine according to Embodiment 1 of the present invention, it has been explained that the rotating machine unit 2 and the electric-power conversion unit 3 are integrated with each other; however, even when the rotating machine unit 2 and the electric-power conversion unit 3 are separated from each other and connected with each other by use of a power cable including electric power wiring leads and signal wiring leads, an effect the same as that of Embodiment 1 can be demonstrated.

With regard to the electric rotating machine according to Embodiment 1 of the present invention, the case where the armature winding 23, which is the stator winding of the stator unit 21, is a three-phase winding has been explained; however, the armature winding 23 is not limited to a three-phase winding, and the present invention can be applied to either a multiphase winding or a multiphase and multi-group winding and an effect the same as that of Embodiment 1 can be demonstrated. The magnetic-field electric power conversion unit 32 is not limited to the circuit illustrated in FIG. 3; even when the magnetic-field electric power conversion unit 32 is formed of an H-bridge circuit or the like, the same function can be provided.

Moreover, in the electric rotating machine and the control method therefor according to Embodiment 1 of the present invention, it may be allowed that based on the control command C from the higher-hierarchy control apparatus 103, the value of the rotation speed or the number of rotations from the rotation sensor unit 25, the value of the magnetic-field current from the current sensor CS, the value of the inter-terminal voltage from the voltage sensor VS, and the duty map stored in the memory M of the calculation unit 41, the calculation unit 41 in the control unit 4 determines whether the control for the electric power generator mode, the control for the motor mode, or the control including the duty signal added to the rectangular wave energization control should be performed. It may be allowed that based on the result of the determination, the calculation unit 41 provides the magnetic-field current duty control command 421, the rectangular wave energization control command 431, and the armature duty control command to the magnetic-field current duty signal generation circuit 42, the rectangular wave energization signal generation circuit 43, and the armature duty signal generation circuit 44, respectively, and then makes the magnetic-field current duty signal generation circuit 42, the rectangular wave energization signal generation circuit 43, and the armature duty signal generation circuit 44 output the respective output signals based on the corresponding foregoing commands. Also in this case, as described above, the signal processing unit 45 performs a logic operation of the rectangular wave energization control signal 432 from the rectangular wave energization signal generation circuit 43 and the armature duty control signal 442 from the armature duty signal generation circuit 44 and then outputs the power-conversion device driving signal, based on the result of the operation.

Furthermore, at least the calculation unit 41 is formed of a processor; however, the magnetic-field current duty signal generation circuit 42, the rectangular wave energization signal generation circuit 43, the armature duty signal generation circuit 44, and the signal processing unit 45 can also be formed of a processor.

The rotation sensor unit 25 may output a rotation speed; alternatively, the calculation unit 41 may perform an operation of a signal from the rotation sensor unit 25 so as to obtain the rotation speed.

In Embodiment 1, as an example, the power-conversion device driving signal has been explained with reference to FIG. 5; however, the power-conversion device driving signal is not limited to this example.

Moreover, in the case where it is not required to reduce the armature current, the duty ratio of the armature duty control signal is set to 100[%] and only the rectangular wave energization control is performed, so that the amount of the calculation by the control unit 4 can be reduced.

Various modifications and alterations of this invention will be apparent to those skilled in the art without departing from the scope and spirit of this invention, and it should be understood that this is not limited to the illustrative embodiments set forth herein.

The electric rotating machine according to Embodiment 1 of the present invention, described heretofore, is obtained by converting the inventions, described below, into tangible forms.

(1) An electric rotating machine including
a rotating machine unit including a stator unit having an armature winding and a rotor unit having a magnetic-field winding, an electric-power conversion unit that has a plurality of electric-power conversion devices and performs electric-power conversion between the rotating machine unit and a power source apparatus through switching operation by the plurality of electric-power conversion devices, and a control unit that controls the electric-power conversion unit; the electric rotating machine is characterized
  in that the rotating machine unit can function in both a motor mode and an electric power generator mode,
  in that the control unit includes
    a calculation unit;
    a rectangular wave energization signal generation circuit that generates a predetermined rectangular wave energization control signal, based on a command from the calculation unit,
    an armature duty signal generation circuit that can generate an armature duty control signal having a predetermined duty ratio, based on a command from the calculation unit, and
    a signal processing unit that generates a power-conversion device driving signal for driving the electric-power conversion device, based on a logic operation of the rectangular wave energization control signal and the armature duty control signal,
  in that the armature duty control signal has a frequency higher than that of the rectangular wave energization control signal, and
  in that when the rotating machine unit is under at least a predetermined operation condition in the motor mode or when the rotating machine unit is under at least a predetermined operation condition in the electric power generator mode, the electric-power conversion unit performs electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

In the electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

(2) The electric rotating machine according to (1), characterized in that the predetermined operation condition in the motor mode is an operation condition at a time when a rotation speed or a number of rotations of the rotating machine unit is a predetermined value or smaller.

In the electric rotating machine according to the present invention, it is made possible to obtain a desired output even when the electric rotating machine rotates at a low rotation speed.

(3) The electric rotating machine according to (1), characterized
  in that the rotor unit of the rotating machine unit is coupled with a crankshaft of an engine mounted in a vehicle, and
  in that the predetermined operation condition in the motor mode is an operation condition at a time when the engine is started.

In the electric rotating machine according to the present invention, it is made possible to obtain a desired output even when the engine is started.

(4) The electric rotating machine according to (1), characterized in that the predetermined operation condition in the electric power generator mode is an operation condition at a time when a rotation speed or a number of rotations of the rotating machine unit is a predetermined value or smaller.

In the electric rotating machine according to the present invention, it is made possible to obtain a compact electric rotating machine that can generate electric power even when in the electric power generator mode, the electric rotating machine rotates at a low rotation speed.

(5) The electric rotating machine according to (1), characterized in that the predetermined operation condition in the electric power generator mode is an operation condition at a time when a rotation speed or a number of rotations of the rotating machine unit is within a predetermined range.

In the electric rotating machine according to the present invention, by limiting, with the rotation speed, the range where the duty control signal in the electric power generator mode is processed, calculation for the control in the electric power generator mode can be simplified.

(6) The electric rotating machine according to any one of (1) through (5), characterized
  in that at least part of the control unit is formed of a processor having a memory,
  in that there is provided a duty map in which the duty ratio of the armature duty control signal is stored in accordance with an operation condition of the rotating machine unit, and
  in that based on the duty map, the calculation unit calculates the predetermined duty ratio of the armature duty control signal and provides the predetermined duty ratio, as a command, to the armature duty signal generation circuit.

In the electric rotating machine according to the present invention, it is made possible to simplify the processing by the calculation unit.

(7) The electric rotating machine according to (6), characterized in that the duty map includes a motor-mode duty map to be utilized at a time of operation in the motor mode and an electric-power-generator-mode duty map to be utilized at a time of operation in the electric power generator mode.

In the electric rotating machine according to the present invention, the respective duty maps for the motor mode and the electric power generator mode are separately administered and stored in the memory; therefore, the processing by the calculation unit can be simplified.

(8) The electric rotating machine according to anyone of (1) through (7), characterized
  in that the electric-power conversion unit has a positive-electrode-side switching arm and a negative-electrode-side switching arm that are connected in series with each other and have respective electric-power conversion devices,
  in that the power-conversion device driving signal includes a positive-electrode-side switching arm driving signal for driving the electric-power conversion device provided in the positive-electrode-side switching arm and a negative-electrode-side switching arm driving signal for driving the electric-power conversion device provided in the negative-electrode-side switching arm,
  in that the signal processing unit generates the positive-electrode-side switching arm driving signal, based on a logic multiplication operation of the rectangular wave energization control signal and the armature duty control signal, and in that the signal processing unit generates the negative-electrode-side switching arm driving signal, based on a logic addition operation of the rectangular wave energization control signal and a reversal signal obtained by reversing the armature duty control signal.

In the electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

(9) The electric rotating machine according to anyone of (1) through (8), characterized in that the rectangular wave energization control signal is a signal in which a rectangular wave having a width of electric angle 180° is periodically generated every electric angle 180°.

In the electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

(10) A control method for an electric rotating machine having a rotating machine unit including a stator unit having an armature winding and a rotor unit having a magnetic-field winding, an electric-power conversion unit that has a plurality of electric-power conversion devices and performs electric-power conversion between the rotating machine unit and a power source apparatus through switching operation by the plurality of electric-power conversion devices, and a control unit that controls the electric-power conversion unit; the control method for an electric rotating machine is characterized in that the rotating machine unit of the electric rotating machine can function in both a motor mode and an electric power generator mode, in that based on a control command, the control unit generates a predetermined rectangular wave energization control signal and an armature duty control signal having a frequency higher than that of the rectangular wave energization control signal and a predetermined duty ratio, in that based on a logic operation of the rectangular wave energization control signal and the armature duty control signal, the control unit generates a power-conversion device driving signal for driving the electric-power conversion device, and in that when the rotating machine unit is under at least a predetermined operation condition in the motor mode or when the rotating machine unit is under at least a predetermined operation condition in the electric power generator mode, there is performed electric-power conversion control in which there are combined rectangular wave energization control where the plurality of electric-power conversion devices are driven by the power-conversion device driving signal so that the armature winding is energized with a rectangular wave and duty energization control where the armature winding is energized with the rectangular wave at the predetermined duty ratio.

In the control method for an electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

(11) The control method for an electric rotating machine according to (10), characterized in that the predetermined operation condition in the motor mode is an operation condition at a time when a rotation speed or a number of rotations of the rotating machine unit is a predetermined value or smaller.

In the control method for an electric rotating machine according to the present invention, it is made possible to obtain a desired output even when the electric rotating machine rotates at a low rotation speed.

(12) The control method for an electric rotating machine according to (10), characterized in that the rotor unit of the rotating machine unit is coupled with a crankshaft of an engine mounted in a vehicle, and in that the predetermined operation condition in the motor mode is an operation condition at a time when the engine is started.

In the control method for an electric rotating machine according to the present invention, it is made possible to obtain a desired output even when the engine is started.

(13) The control method for an electric rotating machine according to (10), characterized in that the predetermined operation condition in the electric power generator mode is an operation condition at a time when a rotation speed or a number of rotations of the rotating machine unit is a predetermined value or smaller.

In the control method for an electric rotating machine according to the present invention, it is made possible to obtain a compact electric rotating machine that can generate electric power even when in the electric power generator mode, the electric rotating machine rotates at a low rotation speed.

(14) The control method for an electric rotating machine according to (10), characterized in that the predetermined operation condition in the electric power generator mode is an operation condition at a time when a rotation speed or a number of rotations of the rotating machine unit is within a predetermined range.

In the control method for an electric rotating machine according to the present invention, by limiting, with the rotation speed, the range where the duty control signal in the electric power generator mode is processed, calculation for the control in the electric power generator mode can be simplified.

(15) The control method for an electric rotating machine according to any one of (10) through (14), characterized in that the electric-power conversion unit has a positive-electrode-side switching arm and a negative-electrode-side switching arm that are connected in series with each other and have respective electric-power conversion devices, in that the signal processing unit generates, as the power-conversion device driving signal, a positive-electrode-side switching arm driving signal for driving the positive-electrode-side switching arm and a negative-electrode-side switching arm driving signal for driving the negative-electrode-side switching arm, in that the positive-electrode-side switching arm driving signal is generated based on a logic multiplication operation of the rectangular wave energization control signal and the armature duty control signal, and in that the negative-electrode-side switching arm driving signal is generated based on a logic addition operation of the rectangular wave energization control signal and a reversal signal obtained by reversing the armature duty control signal.

In the control method for an electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

(16) The control method for an electric rotating machine according to any one of (10) through (15), characterized in that the rectangular wave energization control signal is a signal in which a rectangular wave having a width of electric angle 180° is periodically generated every electric angle 180°.

In the control method for an electric rotating machine according to the present invention, it is made possible to reduce the generation-start rotation speed in the electric power generator mode, while suppressing the driving current in the motor mode; therefore, it is made possible to raise the output in both the motor mode and the electric power generator mode, without upsizing the electric rotating machine.

Various modifications and alterations of this invention will be apparent to those skilled in the art without departing from the scope and spirit of this invention, and it should be understood that this is not limited to the illustrative embodiments set forth herein.

What is claimed is:

1. An electric rotating machine comprising:
   a rotating machine including a stator having an armature winding and a rotor having a magnetic-field winding;
   an electric-power converter that has a plurality of electric-power conversion devices and performs electric-power conversion between the rotating machine and a power source apparatus through switching operation by the plurality of electric-power conversion devices; and
   a controller that controls the electric-power converter,
   wherein the rotating machine is operable in both a motor mode and an electric power generator mode,
   wherein the controller includes
      a calculator;
      a rectangular wave energization signal generation circuit that generates a rectangular wave energization control signal, based on a first command from the calculator;
      an armature duty signal generation circuit that generates an armature duty control signal having a predetermined duty ratio, based on a second command from the calculator, the armature duty control signal having a frequency higher than a frequency of the rectangular wave energization control signal; and
      a signal processor that generates a first power-conversion device driving signal that is applied to a positive-electrode-side switching arm of the electric-power conversion device, based on a multiplication logic operation of the rectangular wave energization control signal and the armature duty control signal, and generates a second power-conversion device driving signal that is applied to a negative-electrode-side switching arm of the electric-power conversion device, based on an addition logic operation of the rectangular wave energization control signal and the armature duty control signal,
   when the rotating machine is under at least a predetermined operation condition in the motor mode or when the rotating machine is under at least a predetermined operation condition in the electric power generator mode.

2. The electric rotating machine according to claim 1, wherein the predetermined operation condition in the motor mode is an operation condition at a time when a rotation speed or a number of rotations of the rotating machine unit is a predetermined value or smaller.

3. The electric rotating machine according to claim 1,
   wherein the rotor of the rotating machine is coupled with a crankshaft of an engine mounted in a vehicle, and
   wherein the predetermined operation condition in the motor mode is an operation condition at a time when the engine is started.

4. The electric rotating machine according to claim 1, wherein the predetermined operation condition in the electric power generator mode is an operation condition at a time when a rotation speed or a number of rotations of the rotating machine is less than or equal to a predetermined value.

5. The electric rotating machine according to claim 1, wherein the predetermined operation condition in the electric power generator mode is an operation condition at a time when a rotation speed or a number of rotations of the rotating machine is within a predetermined range.

6. The electric rotating machine according to claim 1,
   wherein at least part of the controller is formed of a processor having a memory,
   wherein the memory stores a duty map in which the duty ratio of the armature duty control signal is set in accordance with an operation condition of the rotating machine, and
   wherein based on the duty map, the calculator calculates the duty ratio of the armature duty control signal and provides the duty ratio, as the second command, to the armature duty signal generation circuit.

7. The electric rotating machine according to claim 6, wherein the duty map includes a motor-mode duty map to be used in the motor mode and an electric-power-generator-mode duty map to be used in the electric power generator mode.

8. The electric rotating machine according to claim 1,
   wherein the electric-power converter has the positive-electrode-side switching arm and the negative-electrode-side switching arm that are connected in series with each other and have respective electric-power conversion devices,
   wherein the first power-conversion device driving signal drives the electric-power conversion device provided in the positive-electrode-side switching arm and the second power-conversion device driving signal drives the electric-power conversion device provided in the negative-electrode-side switching arm,
   wherein the addition logic operation is performed based on the rectangular wave energization control signal and a reversal signal obtained by reversing the armature duty control signal.

9. The electric rotating machine according to claim 1, wherein the predetermined rectangular wave energization control signal is a signal in which a rectangular wave having a width of electric angle 180° is periodically generated every electric angle 180°.

10. A control method for an electric rotating machine including a rotating machine including a stator having an armature winding and a rotor having a magnetic-field winding, an electric-power converter that has a plurality of electric-power conversion devices and performs electric-power conversion between the rotating machine and a power source apparatus through switching operation by the plurality of electric-power conversion devices, and a controller that controls the electric-power converter, the rotating machine of the electric rotating machine being operable in both a motor mode and an electric power generator mode, wherein the control method comprises:

generating a rectangular wave energization control signal and an armature duty control signal having a frequency higher than a frequency of the rectangular wave energization control signal and a predetermined duty ratio; and when the rotating machine is under at least a predetermined operation condition in the motor mode or when the rotating machine is under at least a predetermined operation condition in the electric power generator mode, generating a first power-conversion device driving signal that is applied to a positive-electrode-side switching arm of the electric-power conversion device, based on a multiplication logic operation of the rectangular wave energization control signal and the armature duty control signal, and generating a second power-conversion device driving signal that is applied to a negative-electrode-side switching arm of the electric-power conversion device, based on an addition logic operation of the rectangular wave energization control signal and the armature duty control signal.

11. The control method for an electric rotating machine according to claim 10, wherein the predetermined operation condition in the motor mode is an operation condition at a time when a rotation speed or a number of rotations of the rotating machine is a predetermined value or smaller.

12. The control method for an electric rotating machine according to claim 10,
wherein the rotor of the rotating machine unit is coupled with a crankshaft of an engine mounted in a vehicle, and wherein the predetermined operation condition in the motor mode is an operation condition at a time when the engine is started.

13. The control method for an electric rotating machine according to claim 10, wherein the predetermined operation condition in the electric power generator mode is an operation condition at a time when a rotation speed or a number of rotations of the rotating machine is a predetermined value or smaller.

14. The control method for an electric rotating machine according to claim 10, wherein the predetermined operation condition in the electric power generator mode is an operation condition at a time when a rotation speed or a number of rotations of the rotating machine is within a predetermined range.

15. The control method for an electric rotating machine according to claim 10,
wherein the electric-power converter has the positive-electrode-side switching arm and the negative-electrode-side switching arm that are connected in series with each other and have respective electric-power conversion devices,
wherein the control method further comprises driving the positive-electrode-side switching arm based on the first power-conversion device driving signal and driving the negative-electrode-side switching arm based on the second power-conversion device driving signal,
wherein the addition logic operation is performed based on the rectangular wave energization control signal and a reversal signal obtained by reversing the armature duty control signal.

16. The control method for an electric rotating machine according to claim 10, wherein the rectangular wave energization control signal is a signal in which a rectangular wave having a width of electric angle 180° is periodically generated every electric angle 180°.

* * * * *